United States Patent [19]
Coe et al.

[11] Patent Number: 4,823,578
[45] Date of Patent: Apr. 25, 1989

[54] METHOD OF MANUFACTURING SUBSTRATE FOR MEMORY DISK

[75] Inventors: Thomas U. Coe, Saratoga, Calif.; Atsushi Yamazaki, Tochigi, Japan; Chris Krishnan, San Jose, Calif.

[73] Assignees: Furukawa Aluminum Co., Ltd., Tokyo; Kawasaki Steel Corp., Hyogo; C. Itoh & Co., Ltd., Osaka, all of Japan

[21] Appl. No.: 110,764

[22] Filed: Oct. 27, 1987

[30] Foreign Application Priority Data

Dec. 28, 1985 [JP] Japan ................. 60-297596

[51] Int. Cl.$^4$ ................................ B21D 53/00
[52] U.S. Cl. ............................. 72/47; 72/359; 72/379; 360/135
[58] Field of Search ............... 72/47, 352, 354, 359, 72/335, 336, 373, 374, 375, 376, 379; 360/135; 427/130

[56] References Cited

U.S. PATENT DOCUMENTS

| | | | |
|---|---|---|---|
| 2,848,603 | 11/1958 | Herrmann | 72/336 |
| 2,972,183 | 2/1961 | Greenshields | 29/DIG. 18 |
| 3,145,455 | 8/1964 | Zaleske | 72/376 |
| 3,196,660 | 7/1965 | Olson | 72/376 |
| 3,761,333 | 9/1973 | Kleinbeck | 360/135 X |
| 3,797,035 | 3/1974 | Hunt | 360/135 |
| 3,808,079 | 4/1974 | Akashi | 360/135 X |
| 3,845,651 | 11/1974 | Vau | 72/332 |
| 3,886,052 | 5/1975 | Smith | 360/135 X |
| 4,029,541 | 6/1977 | Barlow | 360/135 X |
| 4,030,138 | 6/1977 | Hilier | 360/135 |
| 4,069,360 | 1/1978 | Yanagisawa | 360/135 X |
| 4,071,360 | 1/1978 | Mannino, Jr. | 72/336 |
| 4,403,494 | 9/1983 | McCullough | 72/376 |
| 4,430,387 | 2/1984 | Nakagawa | 360/135 X |
| 4,520,647 | 6/1985 | Economy et al. | 72/379 |
| 4,525,759 | 6/1985 | Valayil | 360/135 |
| 4,588,653 | 5/1986 | Wray | 428/600 |
| 4,711,115 | 12/1987 | Sukonnik | 72/39 |

FOREIGN PATENT DOCUMENTS

| 127523 | 8/1982 | Japan | 72/379 |
|---|---|---|---|
| SP880529 | 12/1987 | Japan . | |
| SP880531 | 12/1987 | Japan . | |

OTHER PUBLICATIONS

Metals Handbook (1948 Ed.), pp. 42, 43.
IBM Technical Disclosure Bulletin, vol. 23, No. 1, Jun. 1980, p. 306, M. F. Doerner, "Magnetic Recording Disk with High Start/Stop Durability and Low Magnetic Errors".
IBM Technical Disclosure Bulletin, vol. 23, No. 9, Feb. 1981, pp. 4032-4033; A. T. Fletcher; "Diskette Marking".
IBM Technical Disclosure Bulletin, vol. 26, No. 3A, Aug. 1983, pp. 1208-1209, W. H. Bachman; "Magnetic Disk Container".

*Primary Examiner*—Lowell A. Larson
*Attorney, Agent, or Firm*—Townsend and Townsend

[57] ABSTRACT

A method of manufacturing a substrate for a memory disk characterized in that a blank material comprising a non-magnetic metal substrate covered with a non-magnetic metal as an underlayer is subjected to a coining operation by two dies having flat compressing surfaces within an apparatus including a mandrel and a die ring arranged to limit the spreading extent of the material whereby a surface having ultra-preciseness is obtained.

3 Claims, 1 Drawing Sheet

METHOD OF MANUFACTURING SUBSTRATE FOR MEMORY DISK

TECHNICAL FIELD

The present invention relates to a method of economically manufacturing substrates for memory disks with ultraprecisely formed surfaces by performing a coining operation on the surfaces of a blank material, the product substrate comprising a non-magnetic metal underlayer over a nonmagnetic metal base plate.

The non-magnetic metal base plates or substrates referred to in this specification shall means substrates made of Al, an Al alloy, Cu, a Cu alloy, Mg, a Mg alloy, Ti, a Ti alloy or composites thereof: and the non-magnetic metal which is to be used as an underlayer shall means a monometallic element such as Cr, non-magnetic metal and alloys such as a Ni-P alloy, a Ni-P-Cu alloy, and austenite stainless steel, etc.

PRIOR ART AND PROBLEMS THEREOF

Conventionally, substrates for magnetic memory disks which are used to record and reproduce letters, sounds and images, etc. have been produced by the following method. That is to say, a non-magnetic metal sheet for substrates, such as an aluminum alloy sheet is punched out to produce doughnut shaped blanks and the outer and inner diameters of the blanks are finished to predetermined dimensions with chamfers formed thereat for easy handling. Next, such surfaces of the metal blanks for the substrates are ultraprecisely finished (with respect to roughness and undulation, etc.) by such processes as machining by use of a diamond bit, polishing, grinding or combinations thereof.

The substrates finished as above are then coated with a non-magnetic metal as an underlayer on each of the opposite surfaces thereof. In a case where this coating is performed by a chemical plating, each surface is plated with a Ni-P alloy or a Ni-P-Cu alloy, or the like to a thickness of approximately 20 $\mu$m, followed by a polishing so that the surface is made smooth.

Another conventional method calls for forming an underlayer (approximately 5 $\mu$m thick) by means of a physical plating such as sputtering Cr or a Ni-P alloy over the smoothly finished or ground surfaces of the metal substrates.

After the substrates have been thus produced, the memory disks, as final products are produced by coating a thin film magnetic substance over the smoothly and precisely finished underlayers of the substrates followed by a further coating of $SiO_2$, $AlO_3$ or C, etc. as a protective layer.

As stated above, the conventional method of manufacturing a substrate for a memory disk has had many disadvantages and drawbacks in that a considerable length of time had to be consumed, as many stages of such processes as machining, grinding or polishing etc. on the substrates and further polishing on the underlayers were required. Thus the production rate was low and many facilities were necessary.

DISCLOSURE OF INVENTION

In view of the drawbacks in the prior art referred to above, the present invention has conceived to solve them. The present invention provides a method of manufacturing a substrate for a memory disk that offers a high production rate by utilizing a coining operation.

Coining is an art usually employed in producing metallic currencies, and it has been general practice to form a relatively large design having indentations and protrusions on a surface to be compressed.

The present invention is different from the conventional method of forming a design having indentations and protrusions as above since it is a method of finishing ultra-precisely and simultaneously the opposite surfaces of a substrate represented by a blank material coated with a non-magnetic material by applying coining pressure on the surfaces with two compressing dies having flat surfaces.

The manufacturing process according to the present invention is performed by a coining apparatus such as that shown in FIG. 1. A blank material (1) made of a non-magnetic metal material coated with a non-magnetic metal as an underlayer is subjected to a coining operation with two dies having smooth surfaces (4 and 5) within the apparatus comprising a mandrel (3) and a die ring (2) adapted to restrict spreading of the material so that the surface of the substrate may be ultra-precisely finished.

A blank material as herein referred to may be made of a non-magnetic metal substrate material (Al, an Al alloy, Cu, a Cu alloy, Mg, a Mg alloy, Ti, a Ti alloy or a composite thereof) which is rolled to exhibit a relatively good surface preciseness (surface roughness Ra 0.10 $\mu$m-0.40 $\mu$m) and plated with an underlayer without machining or grinding, the plating being a direct chemical plating (for instance, plating such as Ni-P, or Ni-P-Cu, etc.) or a direct physical plating such as a vapor-deposition, ion-plating or sputtering (for instance, sputtering of Cr, or Ni-P, etc.) Also a clad sheet may be used which is made of a non-magnetic metal thin sheet clad with an austenite stainless steel by rolling.

A blank material subjected to the coining operation according to the present invention may either be one which is chemically plated or physically plated after being punched to form a doughnut-like shape or one which is punched to a doughnut-like shape from a metal sheet or web covered with a chemical plating, a physical plating or a clad rolling.

According to the invented process, it is possible to obtain an ultra precise surface finish which is at least equivalent to, or better than, a normal process just by performing one coining operation over the underlayer. Also, according to the present invention, it is possible to use a metal blank which is made by directly applying an underlayer on a metal substrate by a chemical plating, a physical plating or clad rolling without any preliminary machining, grinding or polishing, whereby the steps of machining, grinding and polishing can be omitted. Further, the polishing step after the plating which has been required in the conventional method may be omitted.

As explained above, it has been made possible to eliminate a lot of operational steps, to simplify the manufacturing steps and to reduce the number of facilities required whereby the present invention contributes to the possibility of providing a high production rate for manufacturing substrates for memory disks as well as eliminating problems in handling.

While in the foregoing, it has been explained that a relatively precisely rolled metal substrate on which an underlaying of a non-magnetic metal is applied by a chemical or physical plating may be used as a blank material in the present invention, it is also possible to use a metal substrate on which machining, grinding and polishing have been performed to a slight extent to a quality grade lower than that needed for the conventional one and an underlayer is applied by means of a chemical plating or a physical plating.

In the present invention, a surface of a blank material is impressed with a condition of a compressing surface of a die together with being slightly worked under a state of plasticity. Therefore, a die is used that has an ultra-precisely finished compressing surface. Further, in order to minimize variations in the thickness of the sheet gauge of the blank after being copied, it is preferable to make the center region of the compressing surface of the die slightly higher than the remainder.

It is preferable to arrange the coining pressure to be applied on the blank below 5 times the tensile strength of the metal substrate material and the sheet gauge reduction ratio below 4% of the total thickness of the sheet.

Also, it is preferable to coat lubricant on the surface of the blank material from the viewpoint of preventing "build-up". Further, it is preferable to arrange the clearances between the blank material and the die ring and between the blank material and the mandrel to be approximately 0.5% of the inner diameter of the ring and the outer diameter of the ring, respectively.

In the manner described above, it is possible to ultra-precisely finish the surface of a blank material having an underlayer by performing a coining operation thereon such as to achieve a quality better than that obtained in the conventional process.

The reason why the blank material is coined within a combination of a mandrel and a ring adapted to restrict spreading of material is that the state of the precisely finished surface of a die is easily transferred to the copied product by restricting the flow of the material whereby the formed products are obtained with superior quality with respect to surface roughness. Further, the coining operation performed as above is capable of providing products having good accuracy with respect to their inner and outer diameters.

Also, in the present invention, it is effective to use a kiss-ring in order to prevent tilting of a die surface so that the thickness of the products is stably maintained and the quality of the products is minimally affected by the maintenance degree of the pressing equipment employed.

Embodiment

Firstly, a blank material with a doughnut-like shape (inner diameter: 25.126 mmϕ; outer diameter: 94.527 mmϕ) was made from 5086-O Aluminum alloy sheet (Al-Mg Alloy, thickness 1.2 mm). The surface roughness (Ra) was 0.20 μm. The blank material was arranged to have its inner diameter slightly larger and its outer diameter slightly smaller than those of the ring and the mandrel, respectively, (inner diameter of the test ring: 95 mmϕ; outer diameter of the mandrel: 25 mmϕ). The surface of this blank was directly plated with a Ni-P layer without being ground or polished so that the thickness of the plating was 20 μm. This blank is referred to hereinafter as a coining blank material (A).

The surface of a blank material similar to the above was directly coated with a Cr layer by a sputtering process without pre-machining or the like so that the layer thickness was 5μ; this blank material is referred to hereinafter as a coning blank material (B).

These blank materials were coined by a coining apparatus of the type shown in FIG. 1 and coined products were obtained. The coining pressure was arranged to be approximately 4 times the tensile strength of the base sheet of the blank material. The total sheet gauge reduction ratio was approximately 1.1%. The lubricant G 6311 (Viscosity: 1.01, 30° C. cst, oil film strength: 10 μg/cm$^2$) produced by Nippon Machining Oil Co. was used.

Ten sheets of the samples produced were measured, the surface roughness Ra being measured by a surface roughness meter and the values for TIR and acceleration were measured by RVA.

The results are shown in Table 1, the values for this embodiment being the mean values obtained from the 10 coined products.

TABLE 1

| | Surface roughness Ra (μm) | TIR (μm) | Acceleration ratio (m/sec$^2$) |
|---|---|---|---|
| Embodiment A | 0.011 | 14.9 | 9.95 |
| Embodiment B | 0.010 | 14.7 | 9.90 |
| Conventional Process (SEMI Spec.) | less than 0.025 | less than 30.0 | less than 11.40 |

Evaluation was also performed in respect of other qualities required of a memory disk (for instance, parallelism, minute undulation, complete roundness and concentricity). In respect of all these values, it was confirmed that the results were at least equivalent to or better than the values obtained in the conventional process.

Effects of Invention

As explained above, since the opposite surfaces of a substrate for a memory disk are worked simultaneously in high precision by a coining operation using a press in the present invention, it is advantageous in reducing the number of operational steps and in achieving a high production rate. Further, as compared to the conventional method, a substrate for a memory disk can be economically supplied which is equivalent to or better in quality than that of the prior art.

Figure 1:
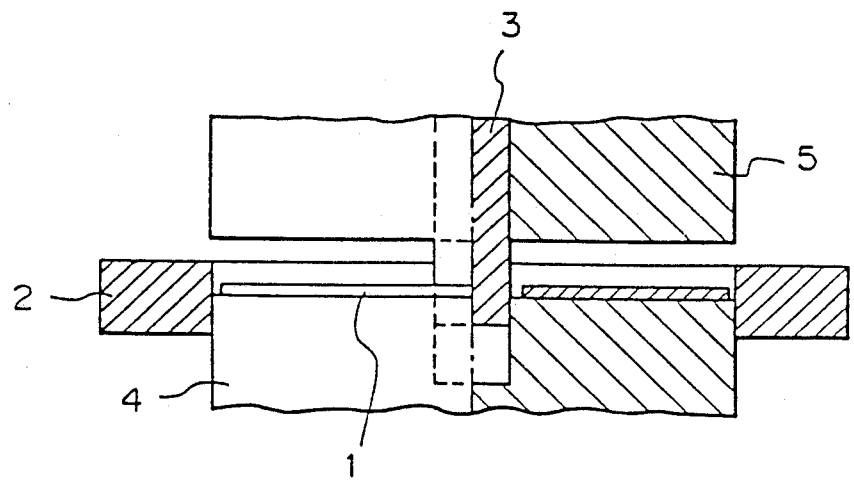
FIG. 1 is an explanatory drawing illustrating a method for manufacturing a substrate for a memory disk according to the present invention.

We claim:

1. A method of manufacturing a substrate for a memory disk characterized in that a blank material comprising a non-magnetic metal substrate covered by plating with a non-magnetic metal as an underlayer is subjected to a coining operation by two dies having flat compressing surfaces within an apparatus including a mandrel and a die ring arranged to limit the spreading extent of the material whereby a surface having ultra-preciseness is obtained without mechanical surface finishing before and after the coining operation.

2. A manufacturing method as claimed in claim 1 wherein a blank material on which a covering of a non-magnetic metal that is provided by a chemical plating is employed.

3. A manufacturing method as claimed in claim 1 wherein a blank material on which a covering of a non-magnetic metal that is provided by a physical plating is employed.

* * * * *